United States Patent
Yanagawa et al.

(10) Patent No.: US 10,816,376 B2
(45) Date of Patent: Oct. 27, 2020

(54) THERMAL FLOWMETER AND FLOW RATE COMPENSATION METHOD

(71) Applicant: AZBIL CORPORATION, Chiyoda-ku (JP)

(72) Inventors: Yuusei Yanagawa, Chiyoda-ku (JP); Yoshio Yamazaki, Chiyoda-ku (JP); Shinsuke Matsunaga, Chiyoda-ku (JP); Wataru Hasebe, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 231 days.

(21) Appl. No.: 16/048,398

(22) Filed: Jul. 30, 2018

(65) Prior Publication Data

US 2019/0033110 A1   Jan. 31, 2019

(30) Foreign Application Priority Data

Jul. 31, 2017  (JP) .................................. 2017-147621

(51) Int. Cl.
*G01F 1/69* (2006.01)
*G01F 1/68* (2006.01)
(Continued)

(52) U.S. Cl.
CPC .......... *G01F 1/6965* (2013.01); *G01F 1/6847* (2013.01); *G01F 1/69* (2013.01); *G01F 1/696* (2013.01)

(58) Field of Classification Search
CPC ...................................................... G01F 1/69
See application file for complete search history.

(56) References Cited

U.S. PATENT DOCUMENTS

| 6,125,695 A | * | 10/2000 | Alvesteffer | ........... G01F 1/6847 73/204.27 |
| 6,681,625 B1 | * | 1/2004 | Berkcan | ................ G01F 1/6847 73/204.15 |

FOREIGN PATENT DOCUMENTS

| CN | 1330764 A | 1/2002 |
| CN | 105283737 A | 1/2016 |

(Continued)

OTHER PUBLICATIONS

Combined Chinese Office Action and Search Report dated Feb. 21, 2020 in Chinese Patent Application No. 201810816576.7 (with English translation of Category of Cited Documents), 7 pages.

*Primary Examiner* — Jewel V Dowtin
(74) *Attorney, Agent, or Firm* — Oblon, McClelland, Maier & Neustadt, L.L.P.

(57) ABSTRACT

A thermal flowmeter includes: a first thermal resistive element disposed on a pipe and sensing a first temperature of a fluid; a second thermal resistive element disposed on the pipe downstream relative to the first thermal resistive element and sensing a second temperature thereof; a control unit causing the second thermal resistive element to generate heat so that the second temperature is kept higher than the first temperature by a predetermined value; a power measurement unit measuring a power supplied to the second thermal resistive element; a temperature difference gradient calculation unit calculating a gradient of a difference between the second and first temperatures; a power compensation unit compensating the measured power based on the gradient of the difference and a value of the power when no fluid is in the pipe; and a flow rate calculation unit calculating a flow rate of the fluid based on the compensated power.

3 Claims, 4 Drawing Sheets

(51) Int. Cl.
 *G01F 1/696* (2006.01)
 *G01F 1/684* (2006.01)

(56) References Cited

FOREIGN PATENT DOCUMENTS

| | | |
|---|---|---|
| CN | 107923780 A | 4/2018 |
| JP | 2003-106886 A | 4/2003 |
| JP | 2003-532099 | 10/2003 |

\* cited by examiner

THERMAL FLOWMETER AND FLOW RATE COMPENSATION METHOD

CROSS-REFERENCE TO RELATED APPLICATIONS

The present application is based on and claims priority to Japanese Application No. 2017-147621, filed Jul. 31, 2017, the entire contents of which are incorporated herein by reference.

BACKGROUND

1. Field of the Disclosure

The present disclosure relates to a thermal flowmeter that measures the temperature of a fluid at two points, namely, an upstream point and a downstream point, of a pipe, controls a heater so as to keep the difference between the temperatures at the two points constant, and calculates the flow rate of the fluid from a power that is supplied to the heater.

2. Description of the Related Art

A thermal flowmeter according to the related art has a structure in which a heater and temperature sensors are disposed on the exterior of a pipe that constitutes a flow passage for a liquid so that the heater and the temperature sensors are not directly exposed to the liquid to avoid, for example, corrosion due to the liquid (see Japanese Unexamined Patent Application Publication (Translation of PCT Application) No. 2003-532099). In the case of such a structure, the heater and the temperature sensors are not directly exposed to the liquid, and therefore, responsiveness to changes in the flow rate of the liquid is lower than that attained with a structure in which a heater and temperature sensors are directly exposed to a liquid. This results in an increased error in the calculated flow rate, which is an issue.

SUMMARY

The present disclosure has been made to address the above-described issue and provides a thermal flowmeter and a flow rate compensation method with which responsiveness to changes in the flow rate can be improved.

A thermal flowmeter according to an aspect of the present disclosure includes a pipe, a first thermal resistive element, a second thermal resistive element, a control unit, a power measurement unit, a temperature difference gradient calculation unit, a power compensation unit, and a flow rate calculation unit. The pipe is configured to allow a measurement target fluid to flow therethrough. The first thermal resistive element is disposed on the pipe and configured to sense a first temperature of the measurement target fluid. The second thermal resistive element is disposed on the pipe downstream relative to the first thermal resistive element and configured to sense a second temperature of the measurement target fluid. The control unit is configured to output a voltage with which the second temperature is kept higher than the first temperature by a predetermined value and cause the second thermal resistive element to generate heat. The power measurement unit is configured to measure a power that is supplied to the second thermal resistive element. The temperature difference gradient calculation unit is configured to calculate a gradient of a temperature difference between the second temperature and the first temperature. The power compensation unit is configured to compensate the power measured by the power measurement unit on the basis of the gradient of the temperature difference and a known value of the power measured when no fluid is present in the pipe. The flow rate calculation unit is configured to calculate a flow rate of the measurement target fluid on the basis of the power compensated by the power compensation unit.

In the thermal flowmeter described above, the power compensation unit compensates the power only in a case where an absolute value of the gradient of the temperature difference is larger than a predetermined temperature deadband parameter; and the flow rate calculation unit calculates the flow rate of the measurement target fluid on the basis of the power compensated by the power compensation unit in a case where the absolute value of the gradient of the temperature difference is larger than the temperature deadband parameter, and calculates the flow rate of the measurement target fluid by using the power measured by the power measurement unit as is in a case where the absolute value of the gradient of the temperature difference is equal to or smaller than the temperature dead-band parameter.

A flow rate compensation method for a thermal flowmeter according to an aspect of the present disclosure is a flow rate compensation method for a thermal flowmeter, the thermal flowmeter including a pipe allowing a measurement target fluid to flow therethrough, a first thermal resistive element disposed on the pipe and sensing a first temperature of the measurement target fluid, and a second thermal resistive element disposed on the pipe downstream relative to the first thermal resistive element and sensing a second temperature of the measurement target fluid. The method includes: a first step of outputting a voltage with which the second temperature is kept higher than the first temperature by a predetermined value and causing the second thermal resistive element to generate heat; a second step of measuring a power that is supplied to the second thermal resistive element; a third step of calculating a gradient of a temperature difference between the second temperature and the first temperature; a fourth step of compensating the power measured in the second step on the basis of the gradient of the temperature difference and a known value of the power measured when no fluid is present in the pipe; and a fifth step of calculating a flow rate of the measurement target fluid on the basis of the power compensated in the fourth step.

According to an aspect of the present disclosure, the power measured by the power measurement unit is compensated on the basis of the gradient of the temperature difference and a known value of the power measured when no fluid is present in the pipe, and the flow rate of the measurement target fluid is calculated on the basis of the compensated power. Therefore, even if the first and second thermal resistive elements are not directly exposed to the measurement target fluid, responsiveness to changes in the flow rate can be improved, and an error in a flow rate measurement can be decreased.

DETAILED DESCRIPTION

Figure 1:
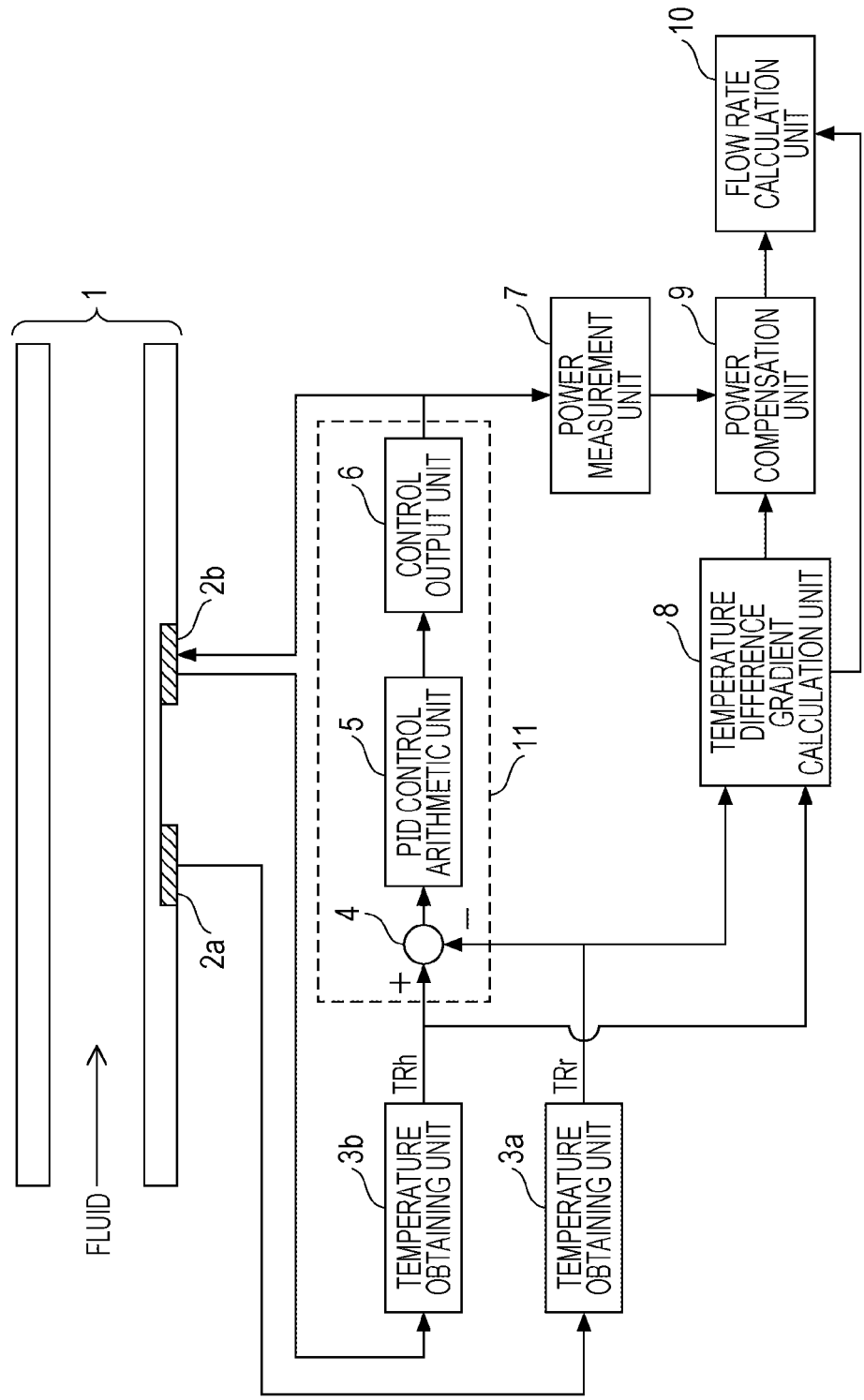
FIG. 1 is a block diagram illustrating a configuration of a thermal flowmeter according to an embodiment of the present disclosure.

Hereinafter, an embodiment of the present disclosure will be described with reference to the drawings. FIG. 1 is a block diagram illustrating a configuration of a thermal flowmeter according to an embodiment of the present disclosure. The thermal flowmeter includes a pipe 1, thermal resistive elements (heaters) 2a and 2b, temperature obtaining units 3a and 3b, a subtractor 4, a PID control arithmetic unit 5, a control output unit 6, a power measurement unit 7, a temperature difference gradient calculation unit 8, a power compensation unit 9, and a flow rate calculation unit 10. The pipe 1 is formed of, for example, glass and allows a measurement target fluid to flow therethrough. The thermal resistive element 2a is formed of, for example, platinum and disposed on the pipe 1, and the thermal resistive element 2b is formed of, for example, platinum and disposed on the pipe 1 downstream relative to the thermal resistive element 2a. The temperature obtaining unit 3a obtains the temperature TRr of the fluid sensed by the thermal resistive element 2a, and the temperature obtaining unit 3b obtains the temperature TRh of the fluid sensed by the thermal resistive element 2b. The subtractor 4 subtracts the temperature TRr from the temperature TRh. The PID control arithmetic unit 5 calculates an operation amount with which the temperature difference (TRh−TRr) is kept constant. The control output unit 6 applies a voltage to the thermal resistive element 2b in accordance with the operation amount calculated by the PID control arithmetic unit 5 to generate heat. The power measurement unit 7 measures a power that is supplied to the thermal resistive element 2b. The temperature difference gradient calculation unit 8 calculates the gradient of the temperature difference between the temperature TRh and the temperature TRr. The power compensation unit 9 compensates the power measured by the power measurement unit 7 on the basis of the gradient of the temperature difference and a known value of the power measured when no fluid is present in the pipe 1. The flow rate calculation unit 10 calculates the flow rate of the measurement target fluid on the basis of the power compensated by the power compensation unit 9. The subtractor 4, the PID control arithmetic unit 5, and the control output unit 6 constitute a control unit 11.

The thermal resistive elements 2a and 2b are each formed on a silicon wafer. The thermal resistive element 2a is formed on a surface of the silicon wafer and is adhered to the pipe 1 such that the surface faces the external wall of the pipe 1. In this manner, the thermal resistive element 2a is fixed to the pipe 1. The thermal resistive element 2b is also fixed in a similar manner to the thermal resistive element 2a. In the example illustrated in FIG. 1, the thermal resistive elements 2a and 2b are adhered to a portion of the pipe 1 having a reduced wall thickness.

Figure 2:
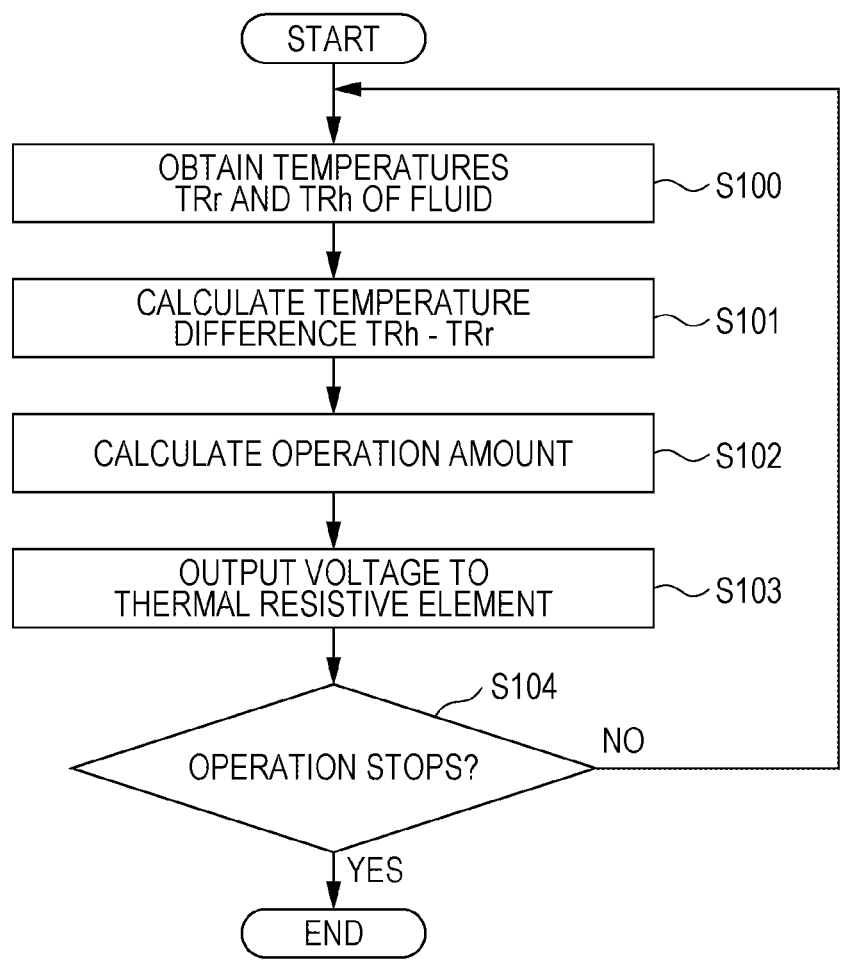
FIG. 2 is a flowchart for describing the operations of temperature obtaining units, a subtractor, a proportional-integral-differential (PID) control arithmetic unit, and a control output unit of the thermal flowmeter according to the embodiment of the present disclosure.

Now, the operations of the thermal flowmeter according to this embodiment are described. FIG. 2 is a flowchart for describing the operations of the temperature obtaining units 3a and 3b, the subtractor 4, the PID control arithmetic unit 5, and the control output unit 6.

The temperature obtaining units 3a and 3b respectively obtain the temperatures TRr and TRh of the fluid that flows through the pipe 1 (step S100 in FIG. 2). Specifically, the temperature obtaining units 3a and 3b respectively sense the resistances of the thermal resistive elements 2a and 2b and obtain the temperatures TRr and TRh of the fluid from a relation between the resistance and the temperature.

The subtractor 4 subtracts the temperature TRr of the upstream fluid from the temperature TRh of the downstream fluid (step S101 in FIG. 2).

The PID control arithmetic unit 5 calculates an operation amount with which the temperature difference $\Delta T = TRh - TRr$ calculated by the subtractor 4 is kept constant (a set point in control and, for example, 10° C.) (step S102 in FIG. 2).

The control output unit 6 applies a voltage to the thermal resistive element 2b in accordance with the operation amount calculated by the PID control arithmetic unit 5 to generate heat (step S103 in FIG. 2).

The process from step S100 to step S103 is performed in each control cycle until the thermal flowmeter stops operating (Yes in step S104 in FIG. 2) to thereby perform PID control such that the temperature TRh of the downstream fluid is kept higher than the temperature TRr of the upstream fluid by a predetermined value.

Figure 3:
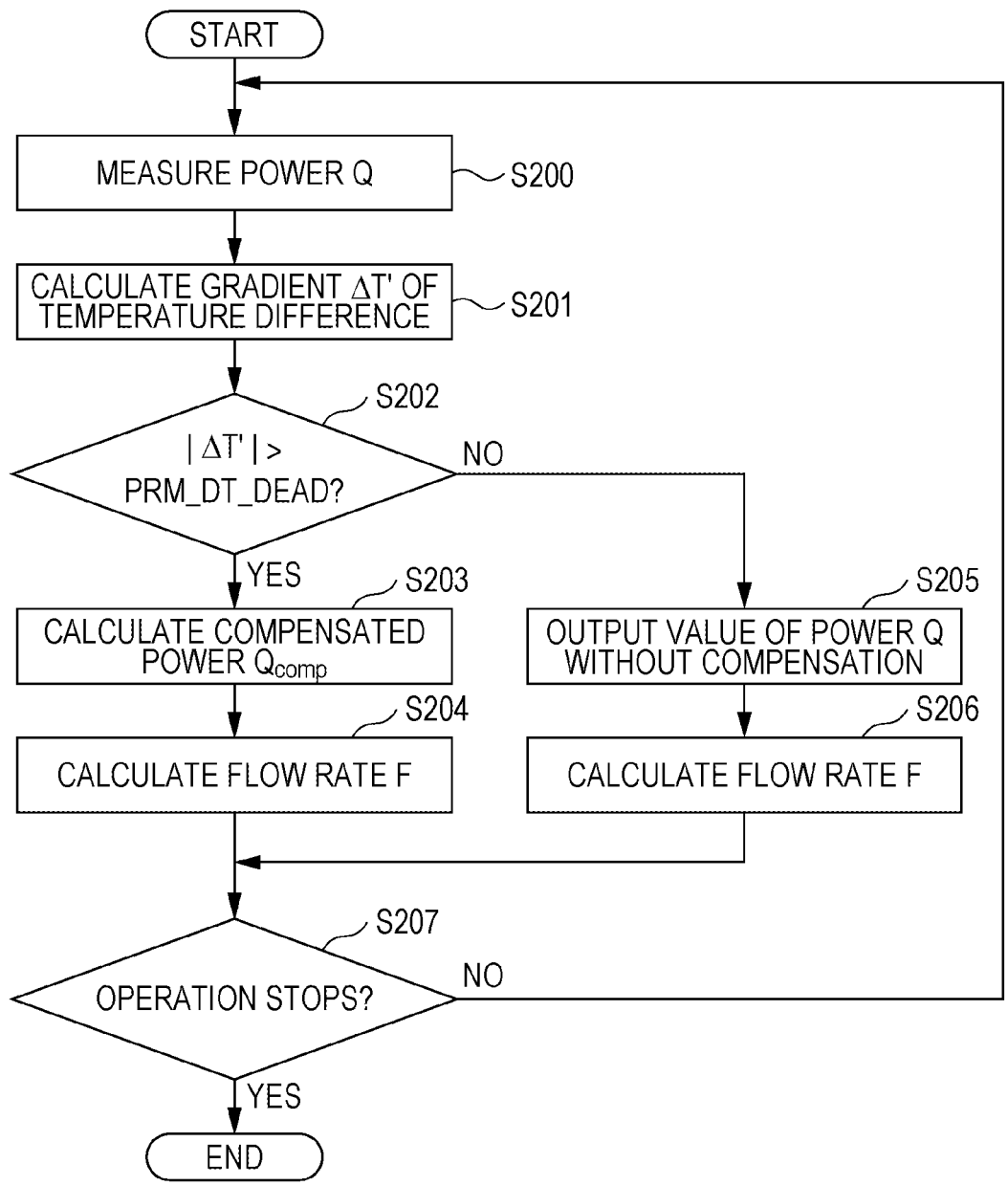
FIG. 3 is a flowchart for describing the operations of a power measurement unit, a temperature difference gradient calculation unit, a power compensation unit, and a flow rate calculation unit of the thermal flowmeter according to the embodiment of the present disclosure.

FIG. 3 is a flowchart for describing the operations of the power measurement unit 7, the temperature difference gradient calculation unit 8, the power compensation unit 9, and the flow rate calculation unit 10. The power measurement unit 7 measures a power Q that is supplied to the thermal resistive element 2b (step S200 in FIG. 3). The power measurement unit 7 calculates the power Q that is supplied to the thermal resistive element 2b by using, for example, a voltage V that is applied to the thermal resistive element 2b and the resistance Rh of the thermal resistive element 2b and using the following equation.

$$Q = V^2 / Rh \qquad (1)$$

Accordingly, the power Q that is needed to keep the temperature TRh of the downstream fluid higher than the temperature TRr of the upstream fluid by a predetermined value can be obtained.

The temperature difference $\Delta T$ between the temperature TRh of the downstream fluid and the temperature TRr of the upstream fluid is controlled by the control unit 11 (the subtractor 4, the PID control arithmetic unit 5, and the control output unit 6) so as to be kept constant as described above; however, the instantaneous value of the temperature difference $\Delta T$ is not necessarily kept constant due to changes in the flow rate of the fluid. Therefore, the temperature difference gradient calculation unit 8 calculates the gradient (which is the slope of the temperature difference and is expressed as a time derivative) $\Delta T'$ of the temperature difference $\Delta T$ (step S201 in FIG. 3).

$$\Delta T' = d\Delta T/dt = d(TRh - TRr)/dt \qquad (2)$$

If the absolute value $|\Delta T'|$ of the temperature difference gradient $\Delta T'$ calculated by the temperature difference gradient calculation unit 8 is larger than a predetermined temperature dead-band parameter PRM_DT_DEAD (Yes in step S202 in FIG. 3), the power compensation unit 9 calculates a power $Q_{comp}$, which is obtained by compensating the power Q measured by the power measurement unit 7 by using the following equation (step S203 in FIG. 3).

$$Q_{comp} = Q - PRM\_D \times (Q - Q_{empty}) \times \Delta T' \quad (3)$$

In equation (3), PRM_D is a predetermined coefficient, and $Q_{empty}$ is a known power Q measured when the pipe 1 is filled with air and no fluid is present therein at all. The power $Q_{empty}$ can be determined in advance by operating the thermal flowmeter as described with reference to FIG. 2 in a state where no fluid is present in the pipe 1 at all.

If the absolute value $|\Delta T'|$ of the temperature difference gradient $\Delta T'$ is larger than the temperature dead-band parameter PRM_DT_DEAD, the flow rate calculation unit 10 converts the value of the power $Q_{comp}$ compensated by the power compensation unit 9 to a flow rate value by using a predetermined flow rate conversion property equation f to thereby calculate the flow rate F of the measurement target fluid (step S204 in FIG. 3).

$$F = f(Q_{comp}) \quad (4)$$

Figure 4:
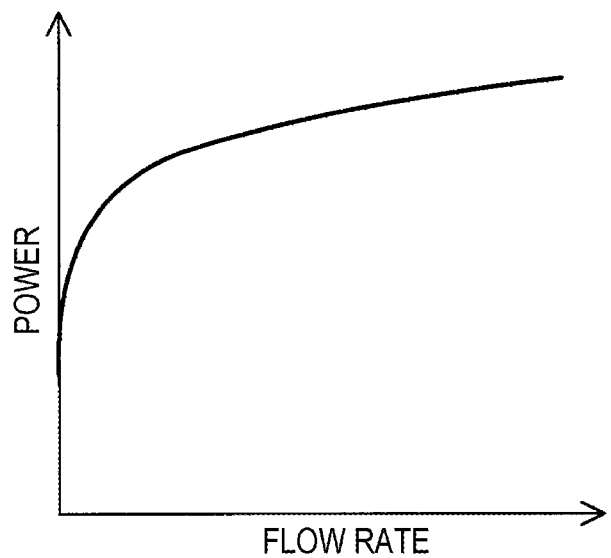
FIG. 4 is a diagram illustrating an example relation between a power and a flow rate in the thermal flowmeter.

FIG. 4 is a diagram illustrating an example relation between the power and the flow rate in the thermal flowmeter. When a relation between the power and the actual flow rate of the measurement target fluid as illustrated in FIG. 4 is obtained by actual measurement, the flow rate conversion property equation f can be determined.

On the other hand, if the absolute value $|\Delta T'|$ of the temperature difference gradient $\Delta T'$ calculated by the temperature difference gradient calculation unit 8 is equal to or smaller than the temperature dead-band parameter PRM_DT_DEAD (No in step S202), the power compensation unit 9 outputs the value of the power Q measured by the power measurement unit 7 as is without compensation (step S205 in FIG. 3).

If the absolute value $|\Delta T'|$ of the temperature difference gradient $\Delta T'$ is equal to or smaller than the temperature dead-band parameter PRM_DT_DEAD, the flow rate calculation unit 10 converts the value of the power Q output from the power compensation unit 9 without compensation to a flow rate value by using the flow rate conversion property equation f to thereby calculate the flow rate F of the measurement target fluid (step S206 in FIG. 3).

$$F = f(Q) \quad (5)$$

The process from step S200 to step S206 is performed at predetermined intervals until the thermal flowmeter stops operating (Yes in step S207 in FIG. 3).

Now, the principle of power compensation made by the power compensation unit 9 is described. In a thermal steady state, the following equation approximately holds.

$$(TRh - TRr) \times k(FV) = (Q - Q_{empty}) \quad (6)$$

Here, k(FV) is a heat transfer rate based on the flow velocity FV of the fluid. According to the principle of the thermal flowmeter, when the thermal resistive element 2b (heater) is caused to generate heat so that the temperature difference $\Delta T = (TRh - TRr)$ is kept constant (10° C. in this embodiment), the instantaneous flow rate of the fluid can be obtained from the power Q that is supplied to the thermal resistive element 2b.

However, in a case where the flow rate abruptly changes, a delay occurs in a response of the measured flow rate value to the changing flow rate even if heater control by the control unit 11 is accelerated. This is because the heat transfer rate k(FV) changes slowly relative to the changing flow rate. This delay is due to the thermal properties of the pipe 1 and the fluid and is not improved by PID control.

Therefore, in this embodiment, the power Q that is needed to keep the temperature difference $\Delta T = (TRh - TRr)$ constant is compensated as follows. First, the following equation is obtained from equation (6).

$$k(FV) = (Q - Q_{empty}) \quad (7)$$

From equation (7), the power $Q_{comp}$, which is obtained by compensating the power Q, can be approximated as follows.

$$\Delta k = (Q - Q_{empty}) \Delta T' / \Delta T^2 \quad (8)$$

$$Q_{comp} = \Delta T \times k + \Delta k \times \Delta T \quad (9)$$

Here, $\Delta k$ represents a change in the heat transfer rate k(FV). If the absolute value $|\Delta T'|$ of the temperature difference gradient $\Delta T'$ is larger than the temperature dead-band parameter PRM_DT_DEAD, equation (3) is obtained from equation (8) and equation (9). Here, the temperature dead-band parameter PRM_DT_DEAD is a constant that is determined on the basis of the effective resolution of control of the temperature difference $\Delta T$ by the control unit 11. As the temperature dead-band parameter PRM_DT_DEAD, for example, the absolute value $|\Delta T'|$ of the temperature difference gradient $\Delta T'$ obtained when an error relative to the set point (10° C. in this embodiment) of the temperature difference $\Delta T$ goes beyond an allowance due to a delay in changing of the heat transfer rate k(FV) in response to the changing flow rate needs to be specified.

Further, the coefficient PRM_D in equation (3) is a value that is determined in advance and depends mainly on the physical form of the thermal flowmeter and the properties (mainly, the heat transfer rate k(FV)) of the fluid.

On the other hand, the case where the absolute value $|\Delta T'|$ of the temperature difference gradient $\Delta T'$ is equal to or smaller than the temperature dead-band parameter PRM_DT_DEAD indicates a steady state where the flow rate of the fluid changes to a small degree, and the second term on the right side of equation (3) becomes sufficiently small. Therefore, the power Q measured by the power measurement unit 7 need not be compensated.

The principle of power compensation made by the power compensation unit 9 is as described above.

Figure 5:
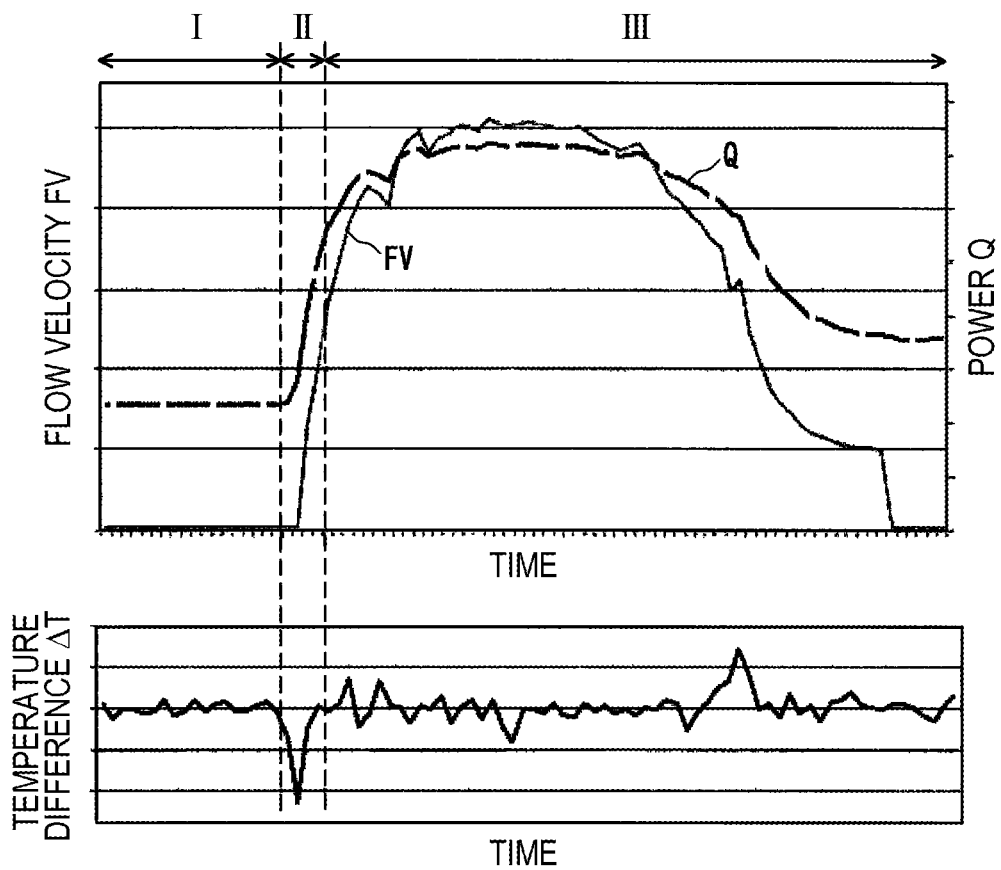
FIG. 5 is a diagram illustrating an example relation between the flow velocity of a fluid, a power, and a temperature difference in the thermal flowmeter.

FIG. 5 is a diagram illustrating an example relation between the flow velocity FV of the fluid, the power Q, and the temperature difference $\Delta T$. In the example illustrated in FIG. 5, the absolute value $|\Delta T'|$ of the temperature difference gradient $\Delta T'$ is larger than the temperature dead-band parameter PRM_DT_DEAD in period II, and the power Q is compensated by using equation (3). In periods I and III, the absolute value $|\Delta T'|$ of the temperature difference gradient $\Delta T'$ is equal to or smaller than the temperature dead-band parameter PRM_DT_DEAD.

As described above, in this embodiment, if the absolute value $|\Delta T'|$ of the temperature difference gradient $\Delta T'$ is equal to or smaller than the temperature dead-band parameter PRM_DT_DEAD (in a steady state where the flow rate changes to a small degree), the flow rate is calculated by using the power Q measured by the power measurement unit 7 as is. If the absolute value $|\Delta T'|$ of the temperature difference gradient $\Delta T'$ is larger than the temperature dead-band parameter PRM_DT_DEAD (in a state where the flow rate abruptly changes), the flow rate is calculated by compensating the power Q. As described above, in this embodiment, the arithmetic method is switched in the steady state and the state where the flow rate abruptly changes. Therefore, responsiveness to changes in the flow rate can be improved, and an error in a flow rate measurement can be decreased.

In the thermal flowmeter according to this embodiment, at least the subtractor 4, the PID control arithmetic unit 5, the temperature difference gradient calculation unit 8, the power compensation unit 9, and the flow rate calculation unit 10 can be implemented by using a computer including a central processing unit (CPU), a memory, and an external interface and a program that controls these hardware resources. The CPU performs the processes described in this embodiment in accordance with the program, which is stored in the memory, to implement the flow rate compensation method for the thermal flowmeter of the present disclosure.

The present disclosure is applicable to thermal flowmeters.

What is claimed is:

1. A thermal flowmeter, comprising:
a pipe configured to allow a measurement target fluid to flow therethrough;
a first thermal resistive element disposed on the pipe and configured to sense a first temperature of the measurement target fluid;
a second thermal resistive element disposed on the pipe downstream relative to the first thermal resistive element and configured to sense a second temperature of the measurement target fluid;
a control circuit configured to output a voltage with which the second temperature is kept higher than the first temperature by a predetermined value, and cause the second thermal resistive element to generate heat;
a power measurement circuit configured to measure a power that is supplied to the second thermal resistive element; and
processing circuitry configured to
calculate a gradient of a temperature difference between the second temperature and the first temperature;
calculate a compensated power from the power measured by the power measurement circuit based on the calculated gradient of the temperature difference and a known value of the power measured when no fluid is present in the pipe, only when an absolute value of the gradient of the temperature difference is larger than a predetermined temperature dead-band parameter;
calculate the flow rate of the measurement target fluid based on the compensated power when the absolute value of the gradient of the temperature difference is larger than the temperature dead-band parameter; and
calculate the flow rate of the measurement target fluid by using the power measured by the power measurement circuit as is when the absolute value of the gradient of the temperature difference is equal to or smaller than the temperature dead-band parameter.

2. A flow rate compensation method for a thermal flowmeter, the thermal flowmeter including a pipe allowing a measurement target fluid to flow therethrough, a first thermal resistive element disposed on the pipe and sensing a first temperature of the measurement target fluid, and a second thermal resistive element disposed on the pipe downstream relative to the first thermal resistive element and sensing a second temperature of the measurement target fluid, the method comprising:

outputting a voltage with which the second temperature is kept higher than the first temperature by a predetermined value and causing the second thermal resistive element to generate heat;
measuring a power that is supplied to the second thermal resistive element;
calculating a gradient of a temperature difference between the second temperature and the first temperature;
calculate a compensated power from the power measured in the second step based on the calculated gradient of the temperature difference and a known value of the power measured when no fluid is present in the pipe, only when an absolute value of the gradient of the temperature difference is larger than a predetermined temperature dead-band parameter;
calculating the flow rate of the measurement target fluid based on the compensated power when the absolute value of the gradient of the temperature difference is larger than the temperature dead-band parameter; and
calculating the flow rate of the measurement target fluid by using the measured power as is when the absolute value of the gradient of the temperature difference is equal to or smaller than the temperature dead-band parameter.

3. A thermal flowmeter, comprising:
a pipe configured to allow a measurement target fluid to flow therethrough;
a first thermal resistive element disposed on the pipe and configured to sense a first temperature of the measurement target fluid;
a second thermal resistive element disposed on the pipe downstream relative to the first thermal resistive element and configured to sense a second temperature of the measurement target fluid;
a control circuit configured to output a voltage with which the second temperature is kept higher than the first temperature by a predetermined value, and cause the second thermal resistive element to generate heat;
a power measurement circuit configured to measure a power that is supplied to the second thermal resistive element; and
processing circuitry configured to
calculate a gradient of a temperature difference between the second temperature and the first temperature;
calculate a compensated power from the power measured by the power measurement circuit based on the calculated gradient of the temperature difference and a known value of the power measured when no fluid is present in the pipe; and
calculate a flow rate of the measurement target fluid based on the compensated power calculated by the power compensation circuit.

* * * * *